(12) United States Patent
Jung

(10) Patent No.: US 8,930,859 B2
(45) Date of Patent: Jan. 6, 2015

(54) METHOD OF DECOMPOSING LAYOUT OF SEMICONDUCTOR DEVICE

(71) Applicant: Samsung Electronics Co., Ltd., Suwon-si, Gyeonggi-do (KR)

(72) Inventor: Sung-Gon Jung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/944,194

(22) Filed: Jul. 17, 2013

(65) Prior Publication Data

US 2014/0033152 A1    Jan. 30, 2014

(30) Foreign Application Priority Data

Jul. 26, 2012 (KR) .................. 10-2012-0081898

(51) Int. Cl.
| | |
|---|---|
| G06F 17/50 | (2006.01) |
| G06F 19/00 | (2011.01) |
| G21K 5/00 | (2006.01) |
| G03F 1/00 | (2012.01) |

(52) U.S. Cl.
CPC ............ *G06F 17/5081* (2013.01); *G06F 19/00* (2013.01); *G06F 17/5072* (2013.01); *G06F 2217/12* (2013.01); *G21K 5/00* (2013.01); *G03F 1/00* (2013.01)
USPC ............... 716/55; 716/54; 716/124; 716/125; 716/136; 700/97; 700/120; 700/121; 430/4; 378/34

(58) Field of Classification Search
CPC ............ G06F 17/5072; G06F 17/5081; G06F 2217/12; G06F 19/00; G21K 5/00; G03F 1/00
USPC ........ 716/55, 54, 124, 125, 136; 700/97, 120, 700/121; 430/4, 5; 378/34, 35
See application file for complete search history.

(56) References Cited

U.S. PATENT DOCUMENTS

| | | | |
|---|---|---|---|
| 7,231,629 B2 | 6/2007 | Laidig | |
| 7,487,489 B2* | 2/2009 | Granik | 716/51 |
| 7,493,589 B2* | 2/2009 | Socha | 716/50 |
| 7,550,235 B2 | 6/2009 | Shi et al. | |
| 7,552,416 B2* | 6/2009 | Granik et al. | 716/50 |
| 7,774,736 B2 | 8/2010 | Broeke et al. | |
| 7,987,434 B2* | 7/2011 | Granik et al. | 716/50 |
| 8,060,842 B2* | 11/2011 | Socha | 716/50 |
| 8,434,031 B2* | 4/2013 | Granik | 716/54 |
| 8,640,058 B2* | 1/2014 | Socha | 716/50 |
| 2005/0149900 A1 | 7/2005 | Laidig | |
| 2006/0269875 A1* | 11/2006 | Granik | 430/311 |
| 2007/0157154 A1* | 7/2007 | Socha | 716/21 |

(Continued)

FOREIGN PATENT DOCUMENTS

KR    10-0817089 B1    3/2008

*Primary Examiner* — Phallaka Kik
(74) *Attorney, Agent, or Firm* — Lee & Morse, P.C.

(57) ABSTRACT

Embodiments relate to a method of decomposing a layout of a semiconductor device. The method may include generating a pattern layout including first patterns and second patterns, generating an interference map for the pattern layout, the interference map including optical interference information regarding the first and second patterns, and decomposing the pattern layout into a first decomposition pattern layout including the first patterns, and a second decomposition pattern layout including the second patterns, based on the interference map. In the interference map, an influence of constructive interference on the first patterns may be greater than an influence of constructive interference on the second patterns.

14 Claims, 12 Drawing Sheets

(56) References Cited

U.S. PATENT DOCUMENTS

| | | | |
|---|---|---|---|
| 2007/0198963 A1* | 8/2007 | Granik et al. ................ 716/19 |
| 2009/0125869 A1* | 5/2009 | Granik et al. ................ 716/19 |
| 2009/0148783 A1* | 6/2009 | Socha .......................... 430/5 |
| 2010/0023915 A1* | 1/2010 | Granik ......................... 716/19 |
| 2010/0047699 A1 | 2/2010 | Broeke et al. |
| 2011/0004856 A1* | 1/2011 | Granik et al. ................ 716/55 |
| 2011/0065028 A1* | 3/2011 | Kodera et al. ............... 430/5 |
| 2011/0078638 A1 | 3/2011 | Kahng et al. |
| 2012/0042291 A1* | 2/2012 | Granik et al. ................ 716/55 |
| 2012/0077114 A1* | 3/2012 | Socha .......................... 430/5 |
| 2013/0227500 A1* | 8/2013 | Sakajiri et al. ............... 716/55 |

* cited by examiner

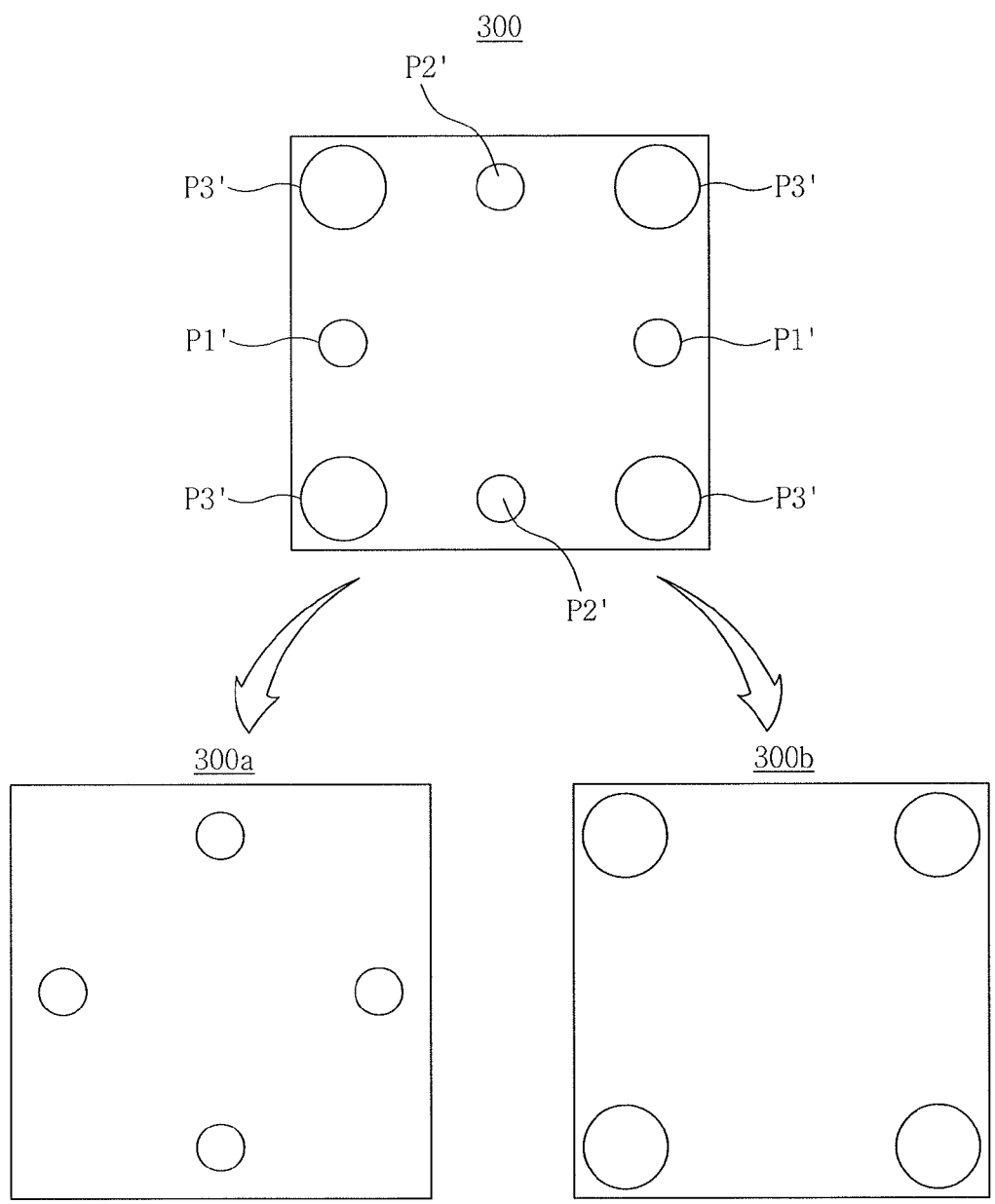

METHOD OF DECOMPOSING LAYOUT OF SEMICONDUCTOR DEVICE

CROSS-REFERENCE TO RELATED APPLICATION

The present application claims priority under 35 U.S.C. §119 to and benefit of Korean Patent Application No. 10-2012-0081898, filed on Jul. 26, 2012, in the Korean Intellectual Property Office, entitled: "Method of Decomposing Layout of Semiconductor Device," which is incorporated by reference herein in its entirety.

BACKGROUND

1. Field

Embodiments relate to methods of decomposing layouts of semiconductor devices.

2. Description of Related Art

As there is a growing trend toward down-scaling of integrated circuits, a photolithographic process that forms a fine pattern on a wafer is desirable.

SUMMARY

Embodiments are directed to a method of decomposing a layout of a semiconductor device, the method may include generating a pattern layout including first patterns and second patterns, generating a first interference map for the pattern layout, the first interference map including optical interference information regarding the first and second patterns, and decomposing the pattern layout into a first decomposition pattern layout including the first patterns, and a second decomposition pattern layout including the second patterns, based on the first interference map. In the first interference map, an influence of constructive interference on the first patterns may be greater than an influence of constructive interference on the second patterns.

Generating the first interference map may include illuminating the pattern layout with a point light source.

The first and second patterns may include island or square patterns.

The island or square patterns of the first patterns may be located at vertices of a virtual rectangular shape.

The island or square patterns of the second patterns may be located at vertices of a virtual diamond shape.

The method may further include generating a second interference map including interference information regarding the first decomposition pattern layout, and determining a first illumination method for the first decomposition pattern layout, based on the second interference map.

Generating the second interference map may include illuminating the first decomposition pattern layout using a crosspole light source or a quasar light source.

Determining the illumination method may include selecting an aperture having openings arranged similar to the first patterns.

The method may further include generating a third interference map including interference information regarding the second decomposition pattern layout, and determining a second illumination method for the second decomposition pattern layout, based on the third interference map.

Embodiments are also directed to a method of decomposing a layout of a semiconductor device, the method may include generating a main pattern layout including a first area and a second area, first patterns and second patterns being formed in the first area, and third patterns being formed in the second area, generating a first decomposition pattern layout including the first patterns, and a second decomposition pattern layout including the second patterns, generating a first decomposition interference map for the first decomposition pattern layout, and a second decomposition interference map for the second decomposition pattern layout, determining a first aperture suitable for the first decomposition pattern layout, and a second aperture suitable for the second decomposition pattern layout, selecting a layout from among the first decomposition pattern layout and the second decomposition pattern layout, the selected layout using a same aperture as that of the third patterns, and decomposing the main pattern layout into a first sub pattern layout including the selected layout and the third patterns, and a second sub pattern layout including an unselected layout, the unselected layout being one of the first decomposition pattern layout and the second decomposition pattern layout other than the selected layout.

Generating the first decomposition pattern layout and the second decomposition pattern layout may include decomposing the main pattern layout in the first area into the first patterns and the second patterns by generating an interference map for the first area including the first and second patterns, and an influence of constructive interference on the first patterns may be greater than an influence of constructive interference on the second patterns.

The first area may be a peripheral area, and the second area may be a cell area.

The first and third patterns may be arranged in a same form.

The second and third patterns may be arranged in different forms.

The third patterns may include island or square patterns.

Embodiments are also directed to a method of decomposing a layout of a semiconductor device, the method may include generating a pattern layout including first patterns and second patterns, generating a first decomposition pattern layout including the first patterns, and a second decomposition pattern layout including the second patterns, generating a first decomposition interference map for the first decomposition pattern layout, the first decomposition interference map including optical interference information that indicates an influence of constructive interference on the first decomposition pattern layout, generating a second decomposition interference map for the second decomposition pattern layout, the second decomposition interference map including optical interference information that indicates an influence of constructive interference on the second decomposition pattern layout, determining a first illumination method for the first decomposition pattern layout based on the influence of constructive interference on the first decomposition pattern layout, and determining a second illumination method for the second decomposition pattern layout based on the influence of constructive interference on the second decomposition pattern layout.

Determining the first illumination method may include selecting a first aperture having openings arranged to increase the influence of constructive interference on the first decomposition pattern layout.

Determining the second illumination method may include selecting a second aperture having openings arranged to increase the influence of constructive interference on the second decomposition pattern layout, and the first aperture may be different from the second aperture.

The first patterns may be located at vertices of a virtual rectangular shape, the second patterns may be located at vertices of a virtual diamond shape, and the virtual rectangular shape may overlap the virtual diamond in the pattern layout.

The first illumination method may include illuminating the first decomposition pattern layout using a quasar light source, and the second illumination method may include illuminating the second decomposition pattern layout using a cross-pole light source.

BRIEF DESCRIPTION OF THE DRAWINGS

Features will become apparent to those of ordinary skill in the art by describing in detail exemplary embodiments with reference to the attached drawings in which:

FIGS. 2A, 2B, 2C, 2D, and 2E illustrate schematic layouts, an interface map, and a aerial images for explaining a method of decomposing a layout in accordance with an embodiment;

DETAILED DESCRIPTION

Figure 1:
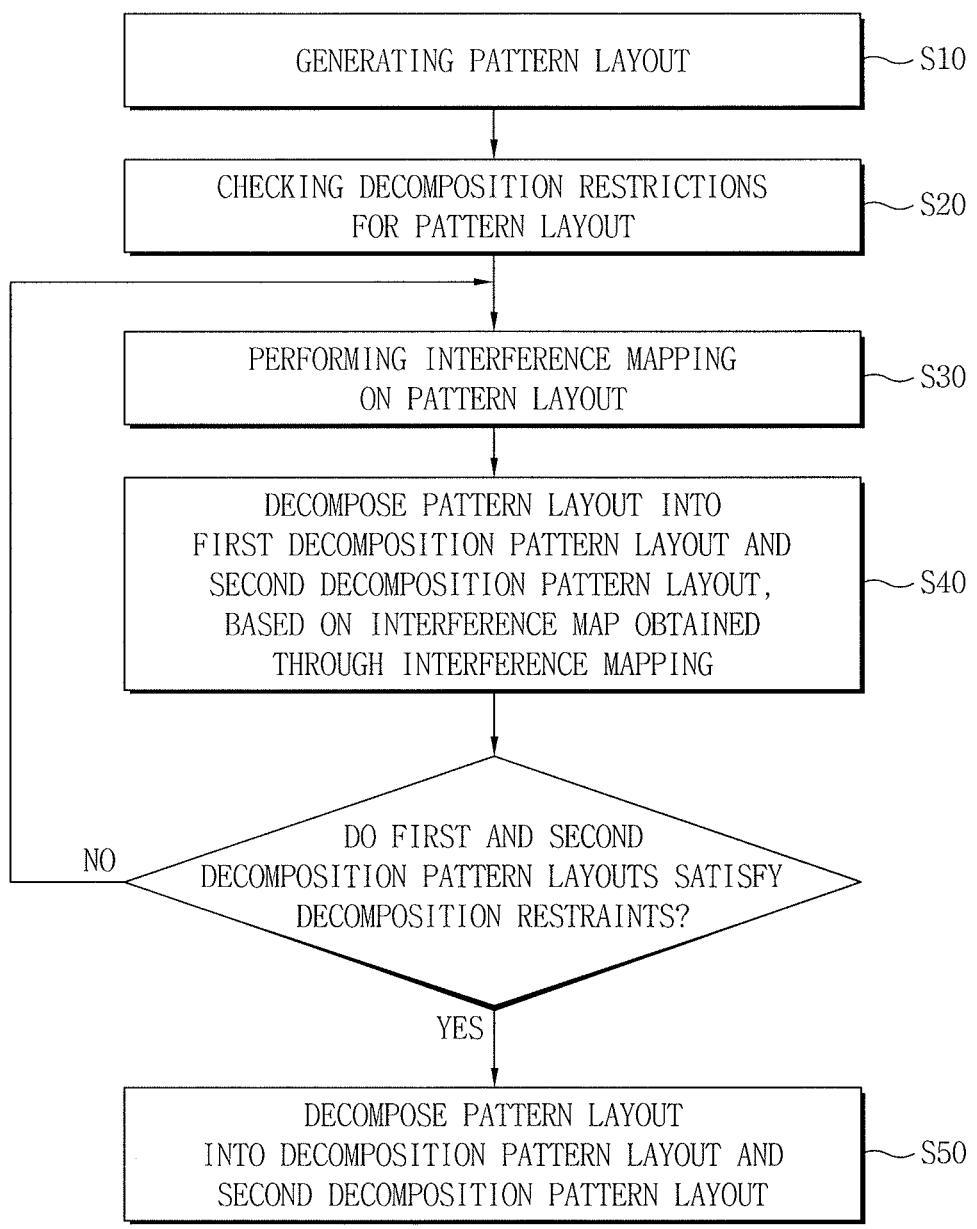
FIG. 1 is a flowchart illustrating a method of decomposing a layout in accordance with an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the sizes and relative sizes of layers and regions may be exaggerated for clarity.

Like numerals refer to like elements throughout. Thus, even if the same or like reference numerals are not described with reference to a related drawing, they may be described with reference to another drawing. Also, even if an element is not assigned a reference numeral in a drawing, this element may be described with reference to other drawings.

FIG. 1 illustrates a flowchart of a method of decomposing a layout in accordance with an embodiment. FIGS. 2A, 2B, 2C, 2D, and 2E are schematic layouts, an interface map, and an aerial image illustrating a method of decomposing layouts in accordance with an embodiment.

Referring to FIGS. 1 and 2A, 2B, 2C, 2D, and 2E, a method of decomposing a layout in accordance with an embodiment may include generating a first pattern layout 100 (operation S10), checking decomposition restrictions for the first pattern layout 100 (operation S20), performing interference mapping (IM) on the first pattern layout 100 (operation S30), decomposing the first pattern layout 100 into a first decomposition pattern layout 100a and a second decomposition pattern layout 100b, based on an interference map obtained through the interference mapping (operation S40), and finally, decomposing the first pattern layout 100 into a first decomposition pattern layout and a second decomposition pattern layout when the first and second decomposition pattern layouts 100a and 100b satisfy the decomposition restrictions (operation S50).

In the current embodiment, the first and second decomposition pattern layouts 100a and 100b may mean layouts of patterns formed on a photomask. Otherwise, the first and second decomposition pattern layouts 100a and 100b may mean layout data of patterns displayed on a monitor of a computer. For example, the first pattern layout 100 may be a layout of patterns formed in a peripheral area of a semiconductor device.

For example, the decomposition restrictions for decomposing the first pattern layout 100 define a space tolerance between patterns of the first pattern layout 100 to be patterned, and may be restrictions according to a design rule so as to reduce or prevent an optical proximity effect from occurring between the patterns. Specifically, the restrictions according to the design rule may include, for example, a minimum width of holes (or lines) forming each pattern, a minimum space between two holes (or lines), and the whole size and density of a designed circuit.

When the patterns decomposed based on the interference map satisfy the decomposition restrictions described above, the first pattern layout 100 may be decomposed into, for example, the first decomposition pattern layout 100a and the second decomposition pattern layout 100b.

That the interference map is added to the decomposition restrictions may mean that the first and second decomposition pattern layouts 100a and 100b satisfy the decomposition restrictions. In detail, it may mean that patterns included in the first and second decomposition pattern layouts 100a and 100b satisfy restrictions defined in the decomposition restrictions (for example, pattern size and a distance between patterns that should be obeyed to perform a photolithographic process).

Through interference mapping, the phenomenon of optical interference may be expressed as a visual image, in consideration of various photolithographic conditions. For example, the phenomenon of optical interference according to the first pattern layout 100 may be expressed as a visual image.

The various photolithographic conditions may include, for example, an optical source, illumination equipment, an illumination method, a photoresist, a developing solution, a developing process, and other various conditions. The optical source may mean a KrF light source, an ArF light source, an F2 light source, an EUV light source, or lights having various wavelengths. The illumination equipment may mean various photolithography equipment, such as a stepper and a scanner, of various manufacturing companies. The illumination method may mean an off-axis illumination (OAI) method using various apertures or deflectors, an illumination method using a phase shift mask (PSM), or other various illumination methods. The photoresist and developer may have different features according to types thereof. An image or side roughness of a pattern may exhibit different features according to a developing process.

A method of decomposing a pattern layout through interference mapping will now be described in greater detail with reference to FIGS. 2A, 2B, 2C, 2D, and 2E.

Figure 2A:
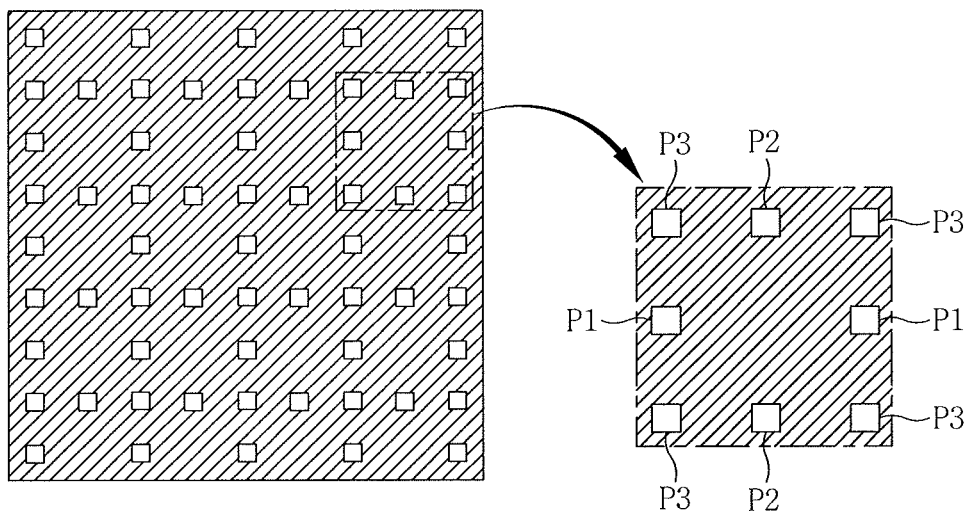

Referring to FIG. 2A, a first pattern layout 100 may include patterns P1, P2, and P3 to be formed on the same layer on a wafer (not shown). For example, it may be hereinafter assumed that the first pattern layout 100 includes first patterns P1 located in a virtual horizontal line, second patterns P2 located on a virtual vertical line, and third patterns P3 that are selectively located at intersections of the virtual horizontal line and the virtual vertical line. The first and second patterns P1 and P2 may be arranged to be respectively located at vertices of a virtual of a diamond (◇)-shape in a unit region. The first and second patterns P1 and P2 may be located in virtual diagonal lines that are parallel with or perpendicular to one another. The third patterns P3 may be arranged to be respectively located at vertices of a virtual rectangular (□)-shape in the unit region. For example, the third patterns P3 may be arranged in the form of grid points. The shapes and sizes of the first to third patterns P1, P2, and P3 are not limited, but for convenience of explanation, it may be assumed that the first to third patterns P1, P2, and P3 are, e.g., island or square type patterns each having the same size.

Figure 2B:
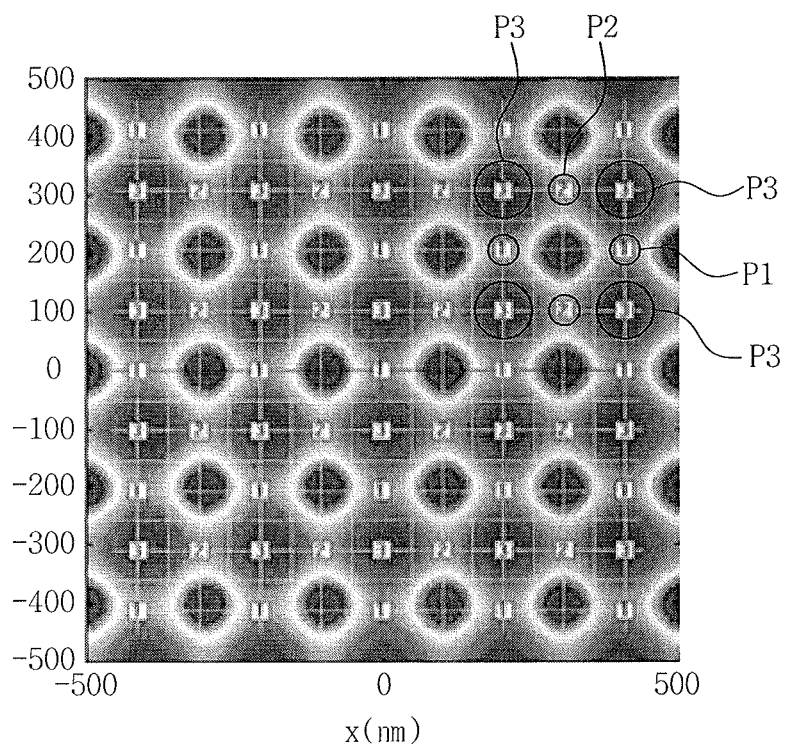

FIG. 2B illustrates a first interference map 200 of the first pattern layout 100. In the interference map 200, the intensities of energies supplied to the regions in which the first to third patterns P1, P2, and P3 are located due to the phenomenon of optical interference are shown with the sizes of the regions and colors. The interference map 200 may be obtained by performing interference mapping using a point light source. The first interference map 200 reveals that the third patterns P3 (having a dark red color in the first interference map 200) are strongly influenced by constructive interference and the first and second patterns P1 and P2 (having a light red color) are hardly influenced by the phenomenon of optical interference. In FIG. 2B, the areas between respective pairs of the first to third patterns P1, P2, and P3 have a blue color.

Figure 2D:
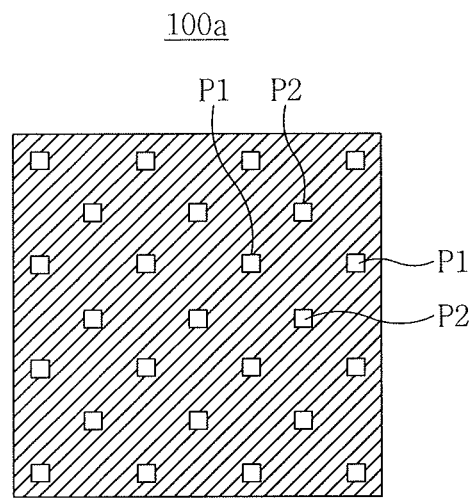
Figure 2E:
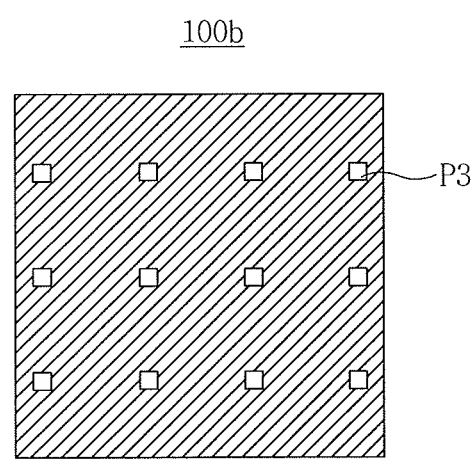

FIG. 2C illustrates a conceptual diagram of an aerial image 300 of the first pattern layout 100. The aerial image 300 illustrates virtual images of the first to third patterns P1, P2, and P3 to be formed on the wafer. Referring to FIG. 2C, in the aerial image 300 of the first pattern layout 100, the sizes of first to third patterns P1', P2', and P3' may vary, caused by the phenomenon of optical interference. For example, the first and second patterns P1' and P2' that are not or are slightly influenced by the phenomenon of optical interference may be formed to be substantially the same as designed, and the third patterns P3' that are influenced by constructive interference may be formed to be greater than as designed. Thus, the first pattern layout 100 may be decomposed into patterns influenced by constructive interference and other patterns, based on the interference map. Specifically, the first pattern layout 100 may be decomposed into a first decomposition pattern image 300a including the first and second patterns P1' and P2', and a second decomposition pattern image 300b including the third patterns P3' being strongly influenced by constructive interference. If the first and second decomposition pattern images 300a and 300b obtained through interference mapping satisfy the decomposition restrictions described above, then the first decomposition pattern layout 100a and the second decomposition pattern layout 100b may be decomposed from the first pattern layout 100 as illustrated in FIGS. 2D and 2E.

Thus, the first decomposition pattern layout 100a may include the first and second patterns P1 and P2 that are slightly or are not influenced by the phenomenon of optical interference, and the second decomposition pattern layout 100b may include the third patterns P3 that are strongly influenced by constructive interference. As described above, by performing interference mapping, the first pattern layout 100 may be decomposed into the second decomposition pattern layout 100b including the third patterns P3 being strongly influenced by constructive interference, and the first decomposition pattern layout 100a including the other patterns P1 and P2.

The first and second decomposition pattern images 300a and 300b decomposed from the first pattern layout 100 through interference mapping may be optical interference information regarding specific patterns before pattern decomposition is performed, and such interference information may be added as a pattern decomposition condition.

When the added result of performing interference mapping satisfies the existing decomposition restrictions, then the first pattern layout 100 may be decomposed into the first decomposition pattern layout 100a and the second decomposition pattern layout 100b, based on the first and second decomposition pattern images 300a and 300b.

As described above, when a pattern is decomposed into sub patterns by adding interference mapping information regarding an input pattern to the decomposition restrictions, the sub patterns may increase a margin for a photolithographic process, thereby improving flexibility and stability of the photolithographic process.

An illumination system (e.g., off-axis illumination (OAI)) suitable for each of the first and second decomposition pattern layouts 100a and 100b may be determined through interference mapping. The determination of the illumination system suitable for each of the first and second decomposition pattern layouts 100a and 100b may be understood as determining an illumination system (e.g., aperture) capable of providing an optical source causing constructive interference to occur between the first or second decomposition pattern layouts 100a and 100b. This will be described in greater detail with reference to FIGS. 3 and 4A to 4C below.

Figure 3:
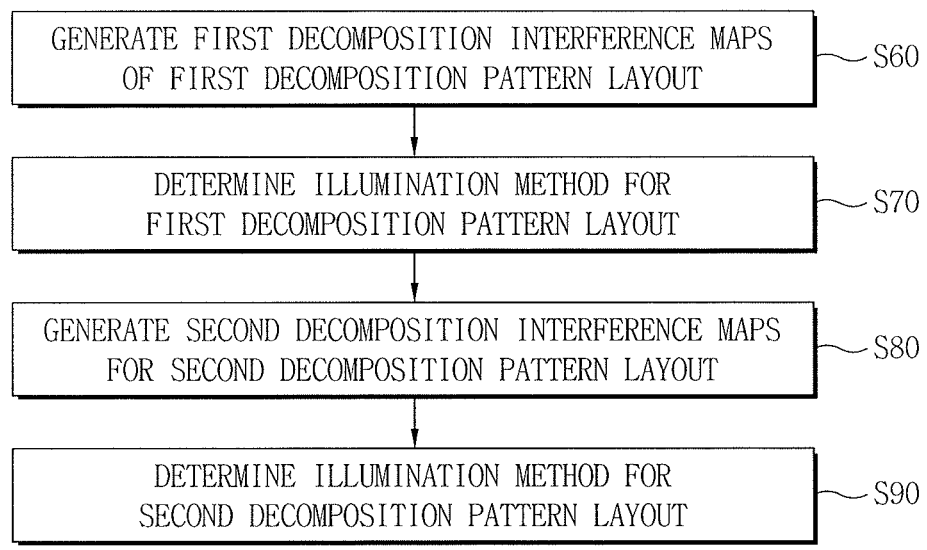
FIG. 3 is a flowchart illustrating a method of decomposing a layout in accordance with an embodiment.
Figure 4A:
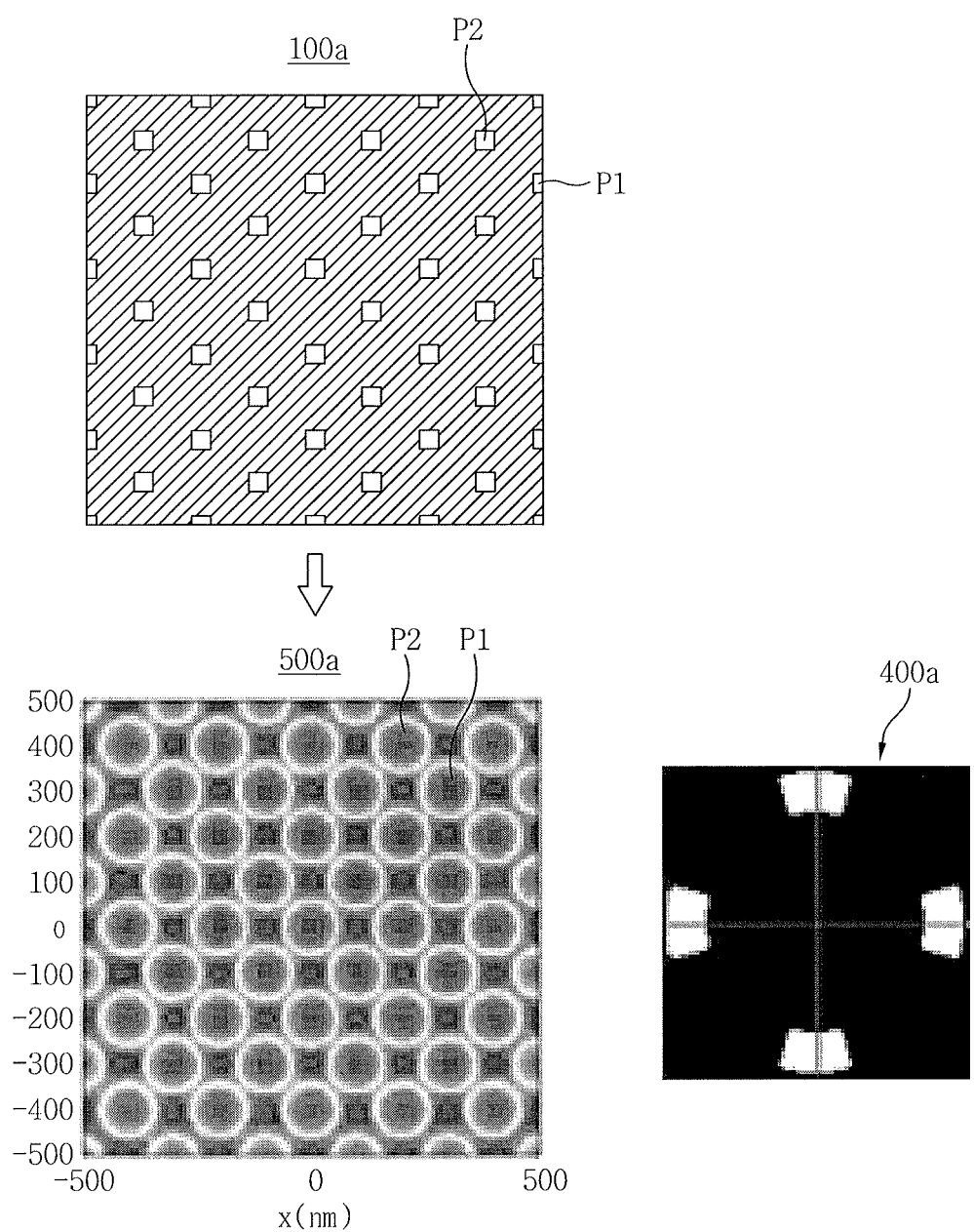
FIGS. 4A, 4B, and 4C illustrate conceptual interference maps and illumination systems for explaining a method of decomposing a layout in accordance with an embodiment.
Figure 4B:
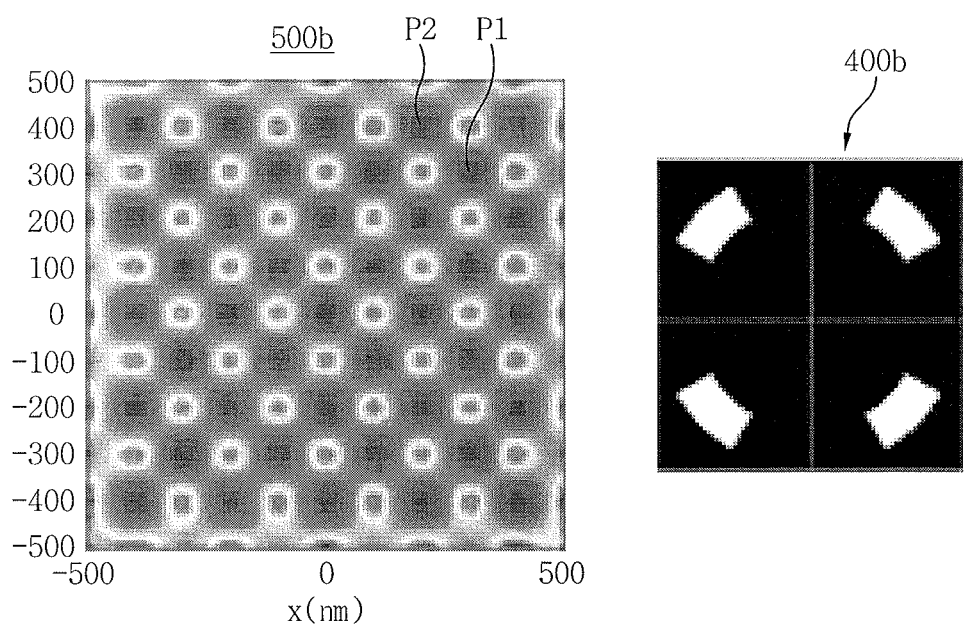
Figure 4C:
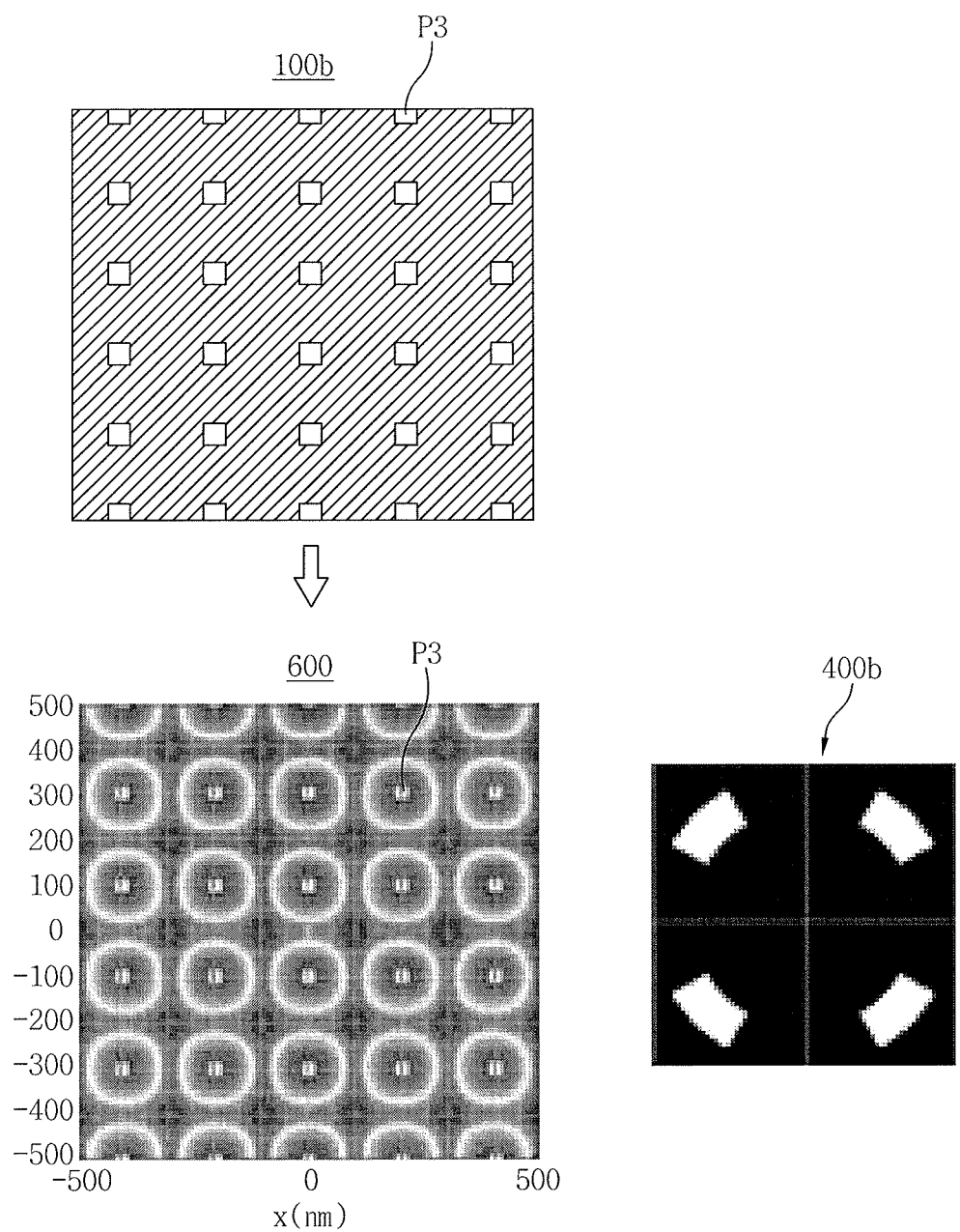

FIG. 3 is a flowchart illustrating a method of decomposing a layout in accordance with an embodiment. FIGS. 4A, 4B, and 4C are conceptual interference maps and illumination systems for explaining a method of decomposing a layout, in accordance with an embodiment.

The method of FIG. 3 will now be described with respect to the first pattern layout 100, the first decomposition pattern layout 100a, and the second decomposition pattern layout 100b described above.

Referring to FIGS. 3 and 4A, 4B, and 4C, the method of decomposing a layout in accordance with an embodiment may include generating first decomposition interference maps of the first decomposition pattern layout 100a (operation S60), determining an illumination method for the first decomposition pattern layout 100a based on the first decomposition interference maps (operation S70), generating second decomposition interference maps for the second decomposition pattern layout 100b (operation S80), and determining an illumination method for the second decomposition pattern layout 100b based on the second decomposition interference maps (operation S90).

FIGS. 4A and 4B illustrate a first decomposition interference map 500a and a second decomposition interference map 500b obtained by performing interference mapping on the first decomposition pattern layout 100a. The first decomposition interference map 500a is obtained by performing interference mapping on the first decomposition pattern layout 100a by using a cross-pole illumination system 400a having openings arranged in the form of a cross (+). The first decomposition interference map 500a shows that the first and second patterns P1 and P2 of the first decomposition pattern layout 100a are strongly influenced by constructive interference (i.e., in the first decomposition interference map 500a, the locations corresponding to the first and second patterns P1 and P2 have a dark red color, whereas the areas between respective pairs of the first and second patterns P1 and P2 have a blue color).

The second decomposition interference map 500b is obtained by performing interference mapping on the first decomposition pattern layout 100a by using a quasar illumination system 400b having openings arranged in the form of quasar (X). The second decomposition interference map 500b shows that the first and second patterns P1 and P2 of the first decomposition pattern layout 100a are hardly influenced by the phenomenon of optical interference (i.e., in the second decomposition interference map 500b, the locations corresponding to the first and second patterns P1 and P2 have a green color, whereas the areas between respective pairs of the first and second patterns P1 and P2 have a red color). Thus, when a photolithographic process is performed on the first decomposition pattern layout 100a using the cross-pole illumination system 400a that has openings arranged in the form of a cross (+) and that causes constructive interference, the first and second patterns P1 and P2 may be appropriately formed even with a low intensity of optical energy or in a simplified manner. Furthermore, even if the intensity of light is low or the photolithographic process is incompletely performed, the first and second patterns P1 and P2 of the first decomposition pattern layout 100a may be stably formed on the wafer. Thus, the first and second patterns P1 and P2 arranged at vertices of a virtual ◇-shape may be more clearly formed when the photolithographic process is performed using the cross-pole illumination system 400a having openings arranged in the form of a cross (+).

FIG. 4C illustrates a third decomposition interference map 600 obtained by performing interference mapping on the second decomposition pattern layout 100b.

The third decomposition interference map 600 shows that the third patterns P3 of the second decomposition pattern layout 100b are strongly influenced by constructive interference when using an illumination system 400b that has openings arranged in the form of a quasar (X) and that causes constructive interference (i.e., in the third decomposition interference map 600, the locations corresponding to the third patterns P3 have a dark red color, whereas the areas between pairs of the third patterns P3 have a blue or green color). Thus, the third patterns P3 may be appropriately formed even with a low intensity of optical energy or in a simplified manner when the photolithographic process is performed on the second decomposition pattern layout 100b by using the illumination system 400b having openings arranged in the form of a quasar (X). Furthermore, the third patterns P3 of the second decomposition pattern layout 100b may be stably formed on the wafer even if the intensity of light is low or the photolithographic process is incompletely performed. Thus, the third patterns P3 arranged at vertices of a virtual □-shape may be more clearly formed when the photolithographic process is performed using the illumination system 400b having openings arranged in the form of a quasar (X).

When the decomposed pattern layouts are patterns in a peripheral area of a semiconductor device, after an optimal illumination system for the decomposed pattern layouts is detected as described above, patterns in the peripheral area that are configurable to be formed with the same illumination system as a cell pattern may be detected from among the decomposed pattern layouts and then configured on the same mask. This will be described in greater detail with reference to the accompanying drawings below.

Figure 5:
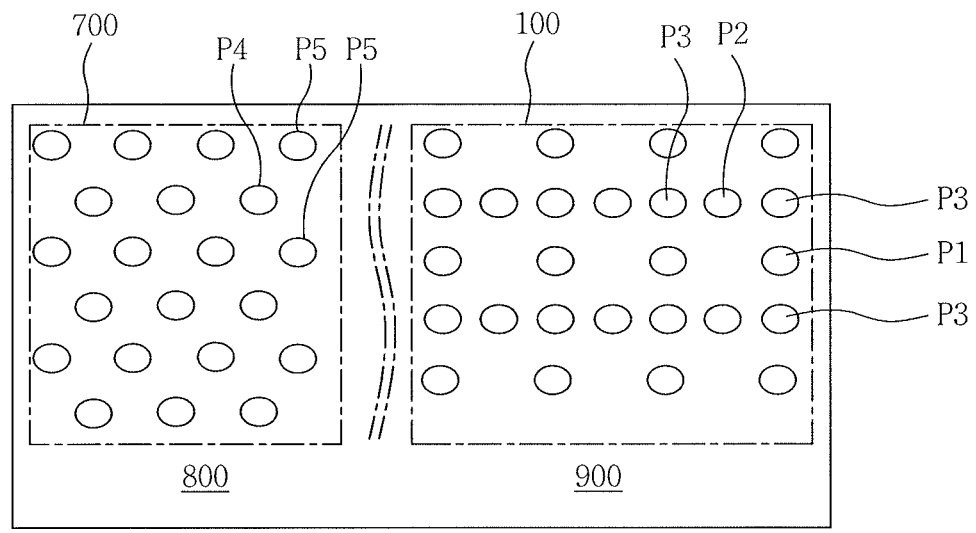
FIG. 5 illustrates a layout of bit line contact (or direct contact (DC)) hole patterns formed in a cell area, and contact patterns formed in a peripheral area.
Figure 6A:
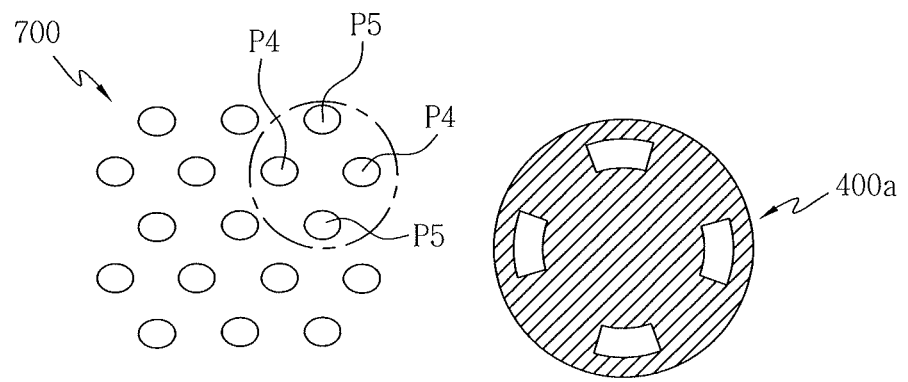
FIG. 6A illustrates contact patterns in a cell area and an illumination system suitable therefor.
Figure 6B:
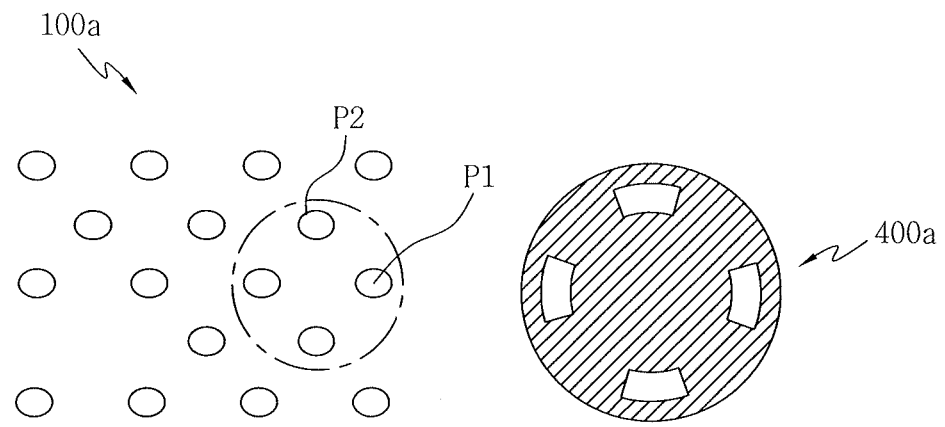
FIGS. 6B and 6C illustrate a first decomposition pattern and a second decomposition pattern in a peripheral area and illumination systems therefor.
Figure 6C:
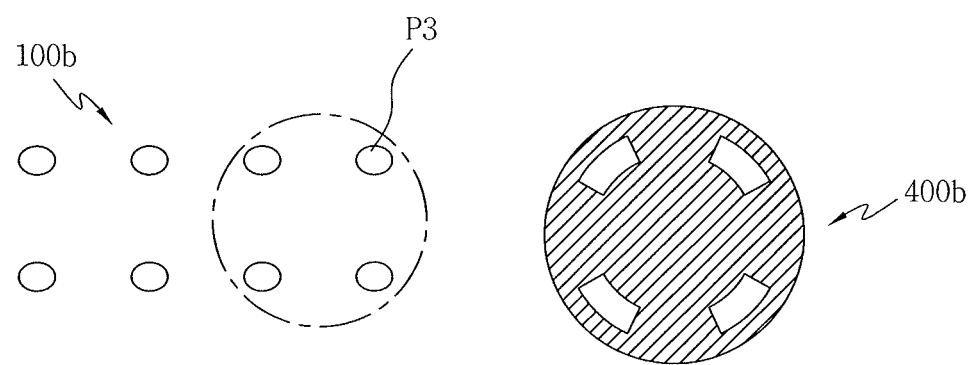
Figure 7A:
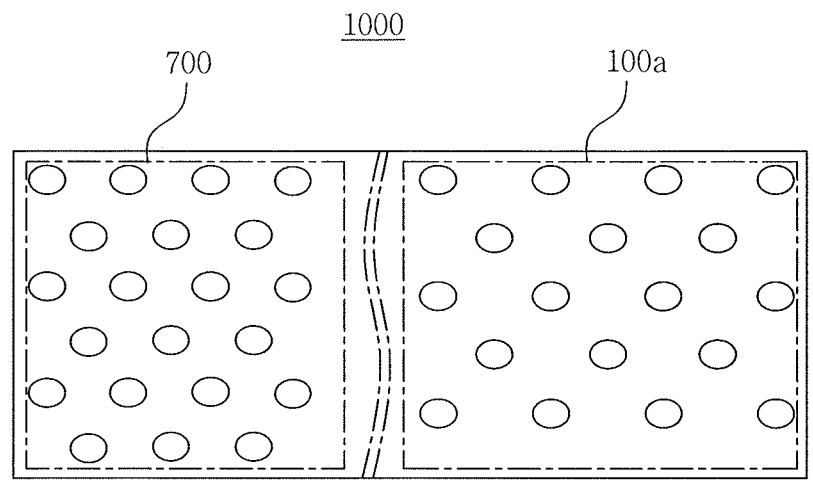
FIGS. 7A and 7B illustrate finally decomposed pattern layouts.
Figure 7B:
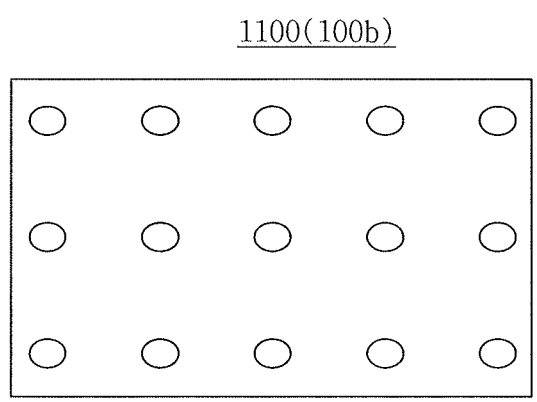

FIG. 5 illustrates a layout of bit line contact (direct contact (DC)) hole patterns formed in a cell area and contact patterns formed in a peripheral area. FIG. 6A illustrates contact patterns in a cell area and an illumination system suitable therefor. FIGS. 6B and 6C illustrate a first decomposition pattern and a second decomposition pattern in a peripheral area and illumination systems suitable therefor. FIGS. 7A and 7B illustrate finally decomposed pattern layouts.

Referring to FIG. 5, the first pattern layout 100 and a second pattern layout 700 may be finally and respectively transcribed onto a peripheral area 900 and a cell area 800 of a photoresist film applied onto a substrate (e.g., a wafer). In this case, pattern decomposition including a method of decomposing a pattern as described above may be applied onto both the cell area 800 and the peripheral area 900.

However, patterns P4 and P5 formed in the cell area 800 may not easily vary, and thus all illumination conditions therefor may be optimized through optical compensation performed, for example, using an interference map, whereas patterns P1, P2, and P3 formed in the peripheral area 900 may be variable. For example, when integration degrees of patterns are high, the first pattern layout 100 in the peripheral area 900 may be decomposed as described above.

A photolithographic process may be simultaneously performed on the cell area 800 and the peripheral area 900 by using the same photomask, and thus at least one of decomposed pattern layouts in the peripheral area 900 may be formed on a mask on which the patterns P4 and P5 in the cell area 800 are formed. In this case, if an optimal illumination system for each of the decomposed patterns is detected by performing interference mapping on the decomposed pattern layouts as described above, then a decomposed pattern layout that is to be foamed on the mask on which the second pattern layout 700 in the cell area 800 is formed may be selected from among the decomposed pattern layouts in the peripheral area 900.

Referring to FIG. 6A, the second pattern layout 700 in the cell area 800 may include the patterns P4 and P5 arranged in the form of a cross (+), such as, e.g., direct contacts (DCs) of a dynamic random access memory (DRAM) device. Optimal illumination environments for such patterns may be realized using the cross-pole illumination system 400a having openings arranged in the form of a cross (+), as described above.

Referring to FIGS. 5, 6B, and 6C, the first pattern layout 100 in a peripheral area 900 may be decomposed into the first decomposition pattern layout 100a having the patterns P1 and P2 arranged in the form of a cross (+), and the second decomposition pattern layout 100b having the patterns P3 arranged in the form of a quasar (X).

In this case, an optimal illumination system for the first decomposition pattern layout 100a may be the cross-pole illumination system 400a having openings arranged in the form of a cross (+), and an optimal illumination system for the second decomposition pattern layout 100b may be the quasar illumination system 400b having openings arranged in the form of a quasar (X).

Thus, according to the inventive concept, the second pattern layout 700 in the cell area 800 and the first decomposition pattern layout 100a that both use the cross-pole illumination system 400a having openings arranged in the form of a cross (+) may be united as one layout.

Finally, referring to FIGS. 7A and 7B, an initial main pattern layout may be decomposed into a first sub pattern layout 1000 obtained by uniting the first decomposition pattern layout 100a with the second pattern layout 700, and a second sub pattern layout 1100 of the second decomposition pattern layout 100b.

Figure 8:
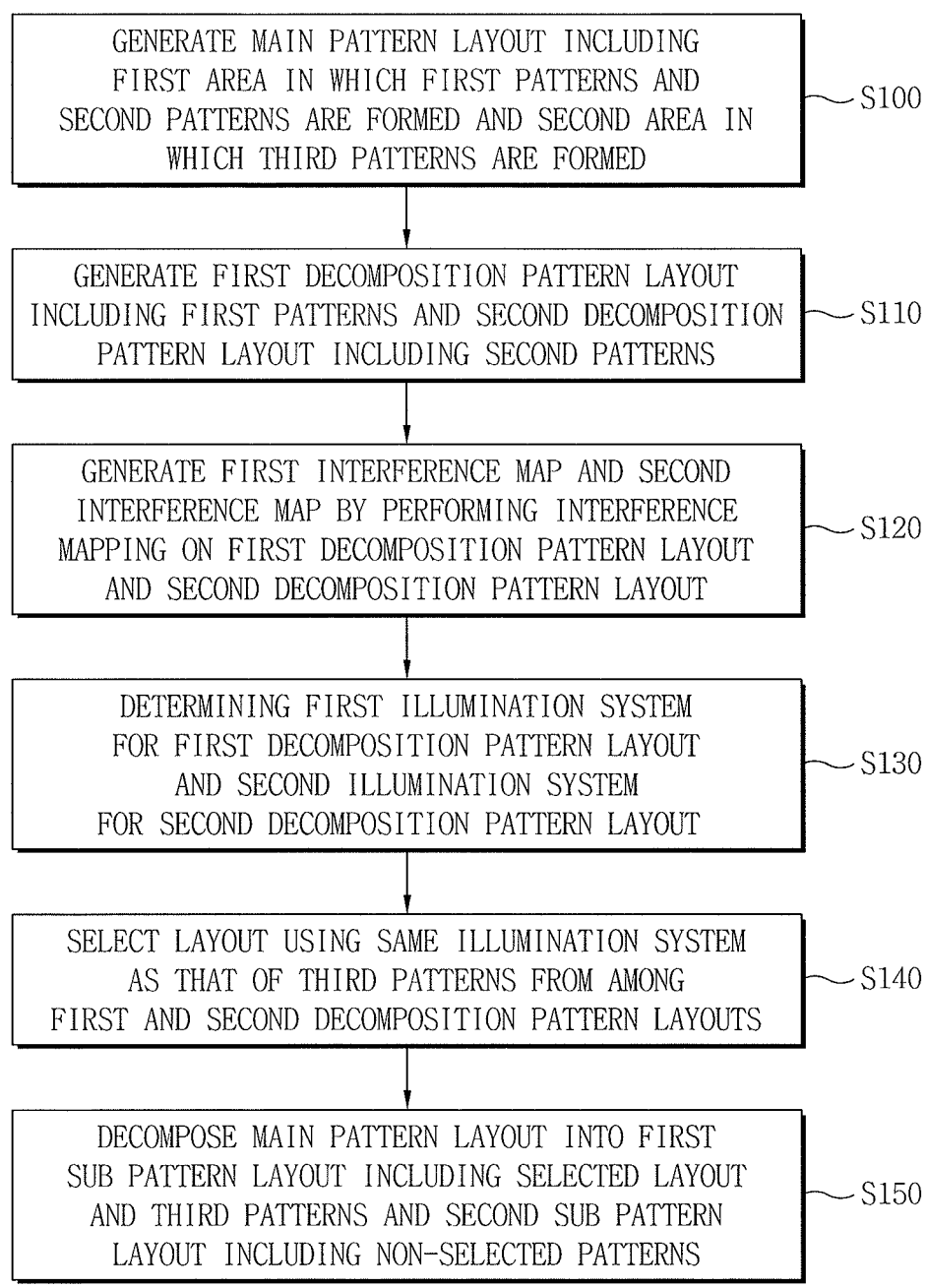
FIG. 8 is a flowchart illustrating a method of decomposing a layout in accordance with an embodiment.

A method of decomposing a layout as described above will now be summarized with reference to FIG. 8.

FIG. 8 is a flowchart illustrating a method of decomposing a layout in accordance with an embodiment.

Referring to FIG. 8, a method of decomposing a layout in accordance with an embodiment may include generating a main pattern layout including a first area (e.g., a peripheral area) in which first patterns and second patterns are formed, and a second area (e.g., a cell area) in which third patterns are formed (operation S100), generating a first decomposition pattern layout including the first patterns, and a second decomposition pattern layout including the second patterns (operation S110), generating a first interference map and a second interference map by performing interference mapping on the first decomposition pattern layout and the second decomposition pattern layout (operation S120), determining a first illumination system for the first decomposition pattern layout and a second illumination system for the second decomposition pattern layout (operation S130), selecting a layout that uses the same illumination system as that of the third patterns from among the first and second decomposition pattern layouts (operation S140), and decomposing the main pattern layout into a first sub pattern layout including the selected layout and the third patterns, and a second sub pattern layout including the non-selected patterns (operation S150).

In methods of decomposing a layout of a semiconductor device in accordance with embodiments, pattern decomposition may be performed by decomposing the original layout into patterns influenced by constructive interference and the other patterns through interference mapping, and adding the result of the decomposing into decomposition restrictions, thereby decomposing the original layout into patterns having high photolithographic margins.

By way of summation and review, as integrated circuits are down-scaled, double patterning technology may be introduced to perform a photolithographic process on the same layer twice so as to form a fine pattern on a wafer. However, the fine pattern may cause a design of a decomposition pattern to reach the limit of acceptable exposure margin.

The methods of decomposition a layout of a semiconductor device in accordance with embodiments may cause an increase in the exposure margin of the decomposed pattern. Thus, reliable patterns may be formed, thereby securing product reliability and improving yield.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A method of decomposing a layout of a semiconductor device, the method comprising:
generating a pattern layout including first patterns and second patterns;
generating a first interference map for the pattern layout, the first interference map including optical interference information regarding the first and second patterns; and
decomposing, using a computer, the pattern layout into a first decomposition pattern layout including the first patterns, and a second decomposition pattern layout including the second patterns, based on the first interference map,
wherein, in the first interference map, an influence of constructive interference on the first patterns is greater than an influence of constructive interference on the second patterns.

2. The method as claimed in claim 1, wherein generating the first interference map includes using a point light source.

3. The method as claimed in claim 1, wherein the first and second patterns include island or square patterns.

4. The method as claimed in claim 3, wherein the island or square patterns of the first patterns are located at vertices of a virtual rectangular shape.

5. The method as claimed in claim 3, wherein the island or square patterns of the second patterns are located at vertices of a virtual diamond shape.

6. The method as claimed in claim 1, further comprising:
generating a second interference map including interference information regarding the first decomposition pattern layout; and
determining a first illumination method for the first decomposition pattern layout, based on the second interference map.

7. The method as claimed in claim 6, wherein generating the second interference map includes using a cross-pole light source or a quasar light source.

8. The method as claimed in claim 7, wherein determining the illumination method includes selecting an aperture having openings arranged similar to the first patterns.

9. The method as claimed in claim 8, further comprising:
generating a third interference map including interference information regarding the second decomposition pattern layout; and
determining a second illumination method for the second decomposition pattern layout, based on the third interference map.

10. A method of decomposing a layout of a semiconductor device, the method comprising:
generating a main pattern layout including a first area and a second area, first patterns and second patterns being formed in the first area, and third patterns being formed in the second area;
generating, using a computer, a first decomposition pattern layout including the first patterns, and a second decomposition pattern layout including the second patterns;
generating a first decomposition interference map for the first decomposition pattern layout, and a second decomposition interference map for the second decomposition pattern layout;
determining a first aperture suitable for the first decomposition pattern layout, and a second aperture suitable for the second decomposition pattern layout;
selecting a layout from among the first decomposition pattern layout and the second decomposition pattern layout, the selected layout using a same aperture as that of the third patterns; and
decomposing the main pattern layout into a first sub pattern layout including the selected layout and the third patterns, and a second sub pattern layout including an unselected layout, wherein:
generating the first decomposition pattern layout and the second decomposition pattern layout includes decomposing the main pattern layout in the first area into the first patterns and the second patterns by generating an interference map for the first area including the first and second patterns, and
an influence of constructive interference on the first patterns is greater than an influence of constructive interference on the second patterns.

11. The method as claimed in claim 10, wherein the first area is a peripheral area, and the second area is a cell area.

12. The method as claimed in claim 10, wherein the first and third patterns are arranged in a same form.

13. The method as claimed in claim 12, wherein the second and third patterns are arranged in different forms.

14. The method as claimed in claim 10, wherein the third patterns include island or square patterns.

* * * * *